United States Patent

[11] 3,526,165

| [72] | Inventor | Jack W. Robbins |
| | | 1252 W. Grace, Chicago, Illinois 60613 |
| [21] | Appl. No. | 761,505 |
| [22] | Filed | Sept. 23, 1968 |
| [45] | Patented | Sept. 1, 1970 |

[54] CLARINETS
1 Claim, 4 Drawing Figs.

[52] U.S. Cl............................................................ 84/382
[51] Int. Cl............................................................ G10c 7/06
[50] Field of Search.............................................. 84/382

[56] References Cited
UNITED STATES PATENTS
706,557  8/1902  Heckel........................... 84/382
1,317,219  9/1919  Price................................ 84/382
2,171,624  9/1939  De Marco........................ 84/382

OTHER REFERENCES
Baines, Anthony, Woodwind Instruments and Their History, Faber and Faber Limited, London, 1962, pp. 131—135.

Primary Examiner—Richard B. Wilkinson
Assistant Examiner—Lawrence R. Franklin
Attorney—Max R. Kraus ABSTRACT: A clarinet having a Boehm system of fingering and in addition provided with an additional B natural hole and an additional C natural hole, and means for playing said holes with the left hand.

Patented Sept. 1, 1970

3,526,165

INVENTOR
JACK W. ROBBINS

BY *Max R. Kraus*
ATTORNEY 3,526,165

CLARINETS

BRIEF SUMMARY OF THE INVENTION

Beginners and students learning to play the clarinet have difficulty in the coordination and timing of the fingers of both the left and right hands when playing the instrument. In the conventional clarinet, the fingers of both hands are used to operate all the holes, including the thumb hole and the speaker key, in addition to closing the B natural key with the left little finger and closing the C natural key with the right little finger. This takes a great deal of practice and is time consuming. It takes a minimum of several months to learn the coordination and timing, and as a result many beginners become disenchanted with the instrument and give up the study of it.

With the present invention these disadvantages are overcome in that a new and additional B key and a new and additional C key are provided in the upper joint of the clarinet, each operated by a separate finger lever, which are so positioned that they may be played by the fingers of the left hand, thus, avoiding the "break" from the left to the right hand. With this arrangement the learning process is accelerated and reduced to a minimum period. All of the keys that were previously played with the two hands can now be operated and played with the left hand only.

Other objects will become apparent as this description progresses.

Figure 1:
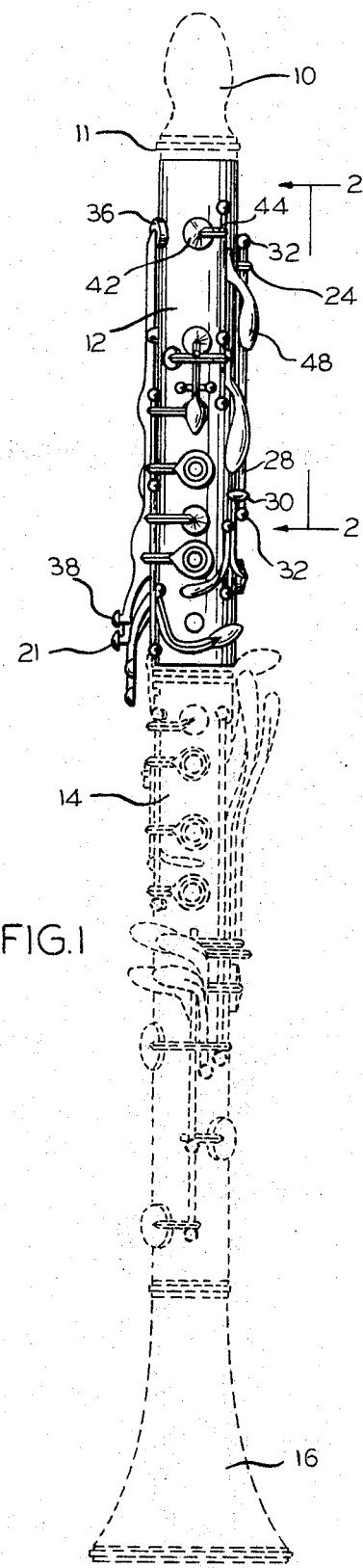
FIG. 1 is a view of a clarinet with the portion to which this invention appertains being shown in full lines.
Figure 2:
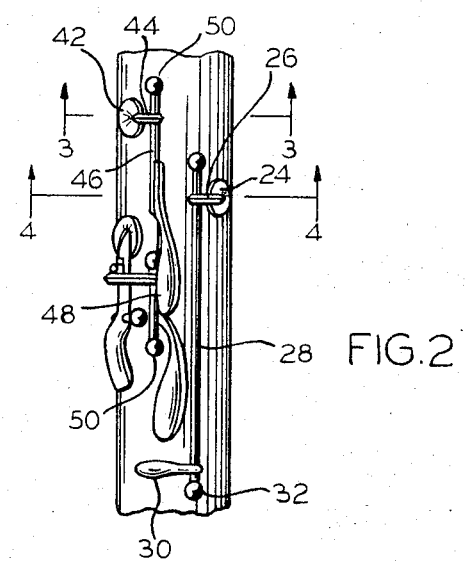
FIG. 2 is a view taken on line 2—2 of FIG. 1 of a portion of the upper joint, showing the new B natural and C natural holes and the keys for operating same.

The clarinet comprises a mouthpiece 10, a barrel joint 11, an upper joint 12, a lower joint 14, and a bell 16. The invention herein is directed to the improvement in the upper joint 12 and only the new holes and the means for playing same will be described in detail. The conventional holes in the upper joint and the means for playing them remain the same, including the conventional B and C natural holes and keys. The holes in the lower joint are conventional and are played in the conventional manner. In addition to the conventional holes are added additional B and C holes and the means for playing same. Thus, the clarinet can be played in the conventional manner by both hands and can also be played by the left hand only in accordance with this invention.

The conventional B natural hole in the upper joint 12 is indicated by the numeral 18 and same is closed by the conventional key pad 20 operated by the conventional finger operated lever 21. The conventional B natural key is operated by the right hand. In the upper joint 12 there is now provided, pursuant to this invention, a new and additional B natural hole, indicated by the numeral 22, which is positioned on the left side of the upper joint, in contradistinction to the conventional B hole 18 which is positioned on the right side.

To operate the additional B hole 22 there is a key pad 24 which is secured to an arm 26 which is secured to a hollow rod 28 provided with a finger lever 30. The rod 28 is rotatably supported at its opposite ends on spaced posts 32 having trunnions which extend into the opposite ends of the hollow rod 28, which in turn are secured to the upper joint 12. The underside of the rod 28 has a projection (not shown) engaged by a spring (not shown) anchored to one of the posts 32, the purpose of which is to return the key pad 24 to close or cover the B hole 22 after the finger has been removed or released from the finger lever 30. The finger lever 30 for the new B hole is positioned on the left side of the upper joint. The key pad and the means for supporting same are conventional and are well known in the art for operating the other holes, therefore, the details thereof are not material. What is important is the introduction of an additional B hole with the means, including the finger lever 30, so positioned on the upper joint that it is operated by a finger of the left hand, in contradistinction to the conventional B hole which had to be operated by a finger on the right hand.

The conventional C natural hole in the upper joint 12 is indicated by the numeral 34 and same is closed by the conventional key pad 36 operated by the conventional finger operated lever 38. The conventional C natural key is operated by the right hand. In the upper joint 12 there is now provided, pursuant to this invention, a new and additional C natural hole 40 which is positioned at the top or generally centrally of either side of the upper joint, in contradistinction to the conventional C hole which is positioned on the right side of the upper joint.

Figure 3:
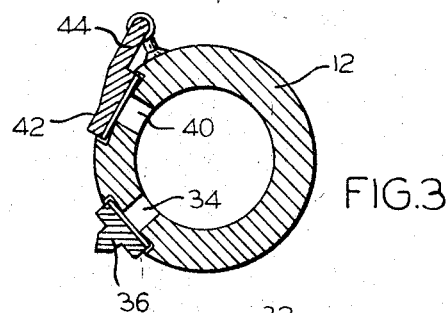
FIG. 3 is an enlarged sectional view taken on line 3—3 of FIG. 2.
Figure 4:
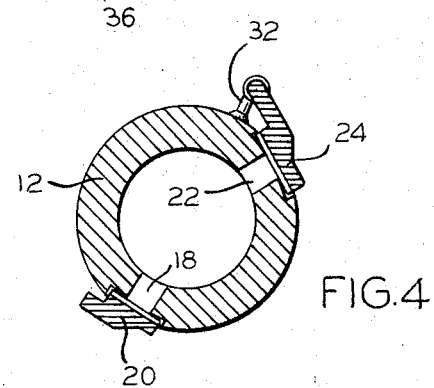
FIG. 4 is an enlarged sectional view taken on line 4—4 of FIG. 2.

To operate the new and additional C hole 40 there is a key pad 42 which is secured to an arm 44 which is secured to a hollow rod 46 provided with a finger lever 48 which, as seen in FIG. 3, is positioned on the left side of the upper joint. The rod 46 is rotatably supported at its opposite ends on spaced posts 50 having trunnions which extend into the opposite ends of the hollow rod 46, which in turn are secured to the upper joint 12. The underside of the rod 46 has a projection (not shown) engaged by a spring (not shown) anchored to one of the posts 50, the purpose of which is to return the key pad 42 to close or cover the C hole 40 after the finger has been removed or released from the finger lever 48. As set forth in connection with the B hole, the details of the operating lever for the new C key are not material. The significant feature is that a new and additional C hole has been introduced and the finger lever 48 for operating same is operated by the left hand, the same hand which now operates the finger lever 30 for operating the new B hole 22.

The lever 30 for opening the new B hole extends laterally of the rod 28 and substantially at right angles to the rod and is positioned rearwardly of the finger lever 48 for opening the new C hole. The term "rearwardly" is used in relation to the mouthpiece which for this description shall be considered the front of the instrument. The finger lever 30 for operating the new B hole may be operated by a finger of the left hand.

The finger lever 48 for opening the new C hole is somewhat different; it extends laterally of the rod 40 but also extends rearwardly in the direction of finger lever 30. Finger lever 48 is engaged by another finger of the left hand. Both operating finger levers 30 and 48 are positioned on the left side of the upper joint and are in general alinement to be easily played by the fingers of the left hand.

The passage from G to B natural is comparatively simple to play and the pupil is able to get over the "break" by the use of only three fingers of the left hand, whereas with the conventional clarinet he would normally use nine fingers, that is, five fingers of the left hand and four fingers of the right hand. The passage from G to C natural is likewise simple, using three fingers of the left hand instead of the conventional eight fingers, four fingers of each hand. With this invention the pupil is able to play a complete chromatic scale, a complete octave from low C to middle C, with only the left hand. In fact, it can be mastered by a beginner within ten days, which permits him to play regular band music with a band.

When playing the new B and C keys, the conventional A key and the conventional speaker key are open, whereas with the conventional B and C keys the A key and speaker key are also in an open position but in playing the conventional C the conventional B key must always be kept open in the conventional way with the right hand in addition to the C key.

I claim:

1. A clarinet having a conventional Boehm system of fingering in which the upper joint has a conventional B hole and a conventional C hole, the improvement comprising, an additional B natural hole and an additional C natural hole in the upper joint, a separate pad for separately closing each of said last mentioned holes each independently of the other, a separate finger control lever for controlling each said pad, said finger control lever for operating said additional B hole positioned rearwardly of the finger control lever for operating said additional C hole and with both said finger control levers positioned on the left side of said upper joint in substantial alinement to be readily engaged by the fingers of the left hand.